April 27, 1965   C. SISKIND ETAL   3,180,243
PHOTOGRAPH PROCESSING APPARATUS
Filed May 22, 1962   3 Sheets-Sheet 1
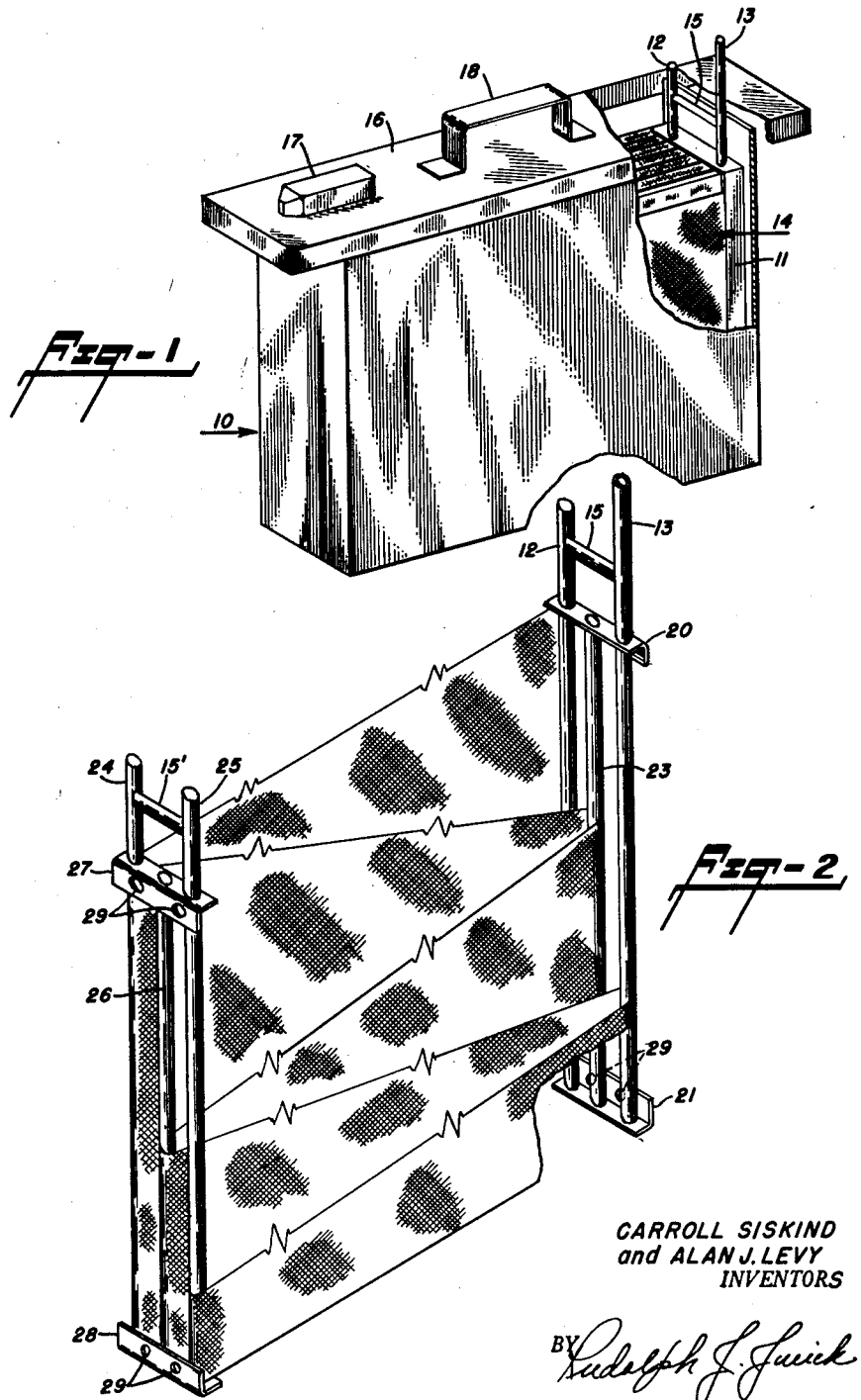
CARROLL SISKIND
and ALAN J. LEVY
INVENTORS
BY Rudolph J. Jurick
ATTORNEY

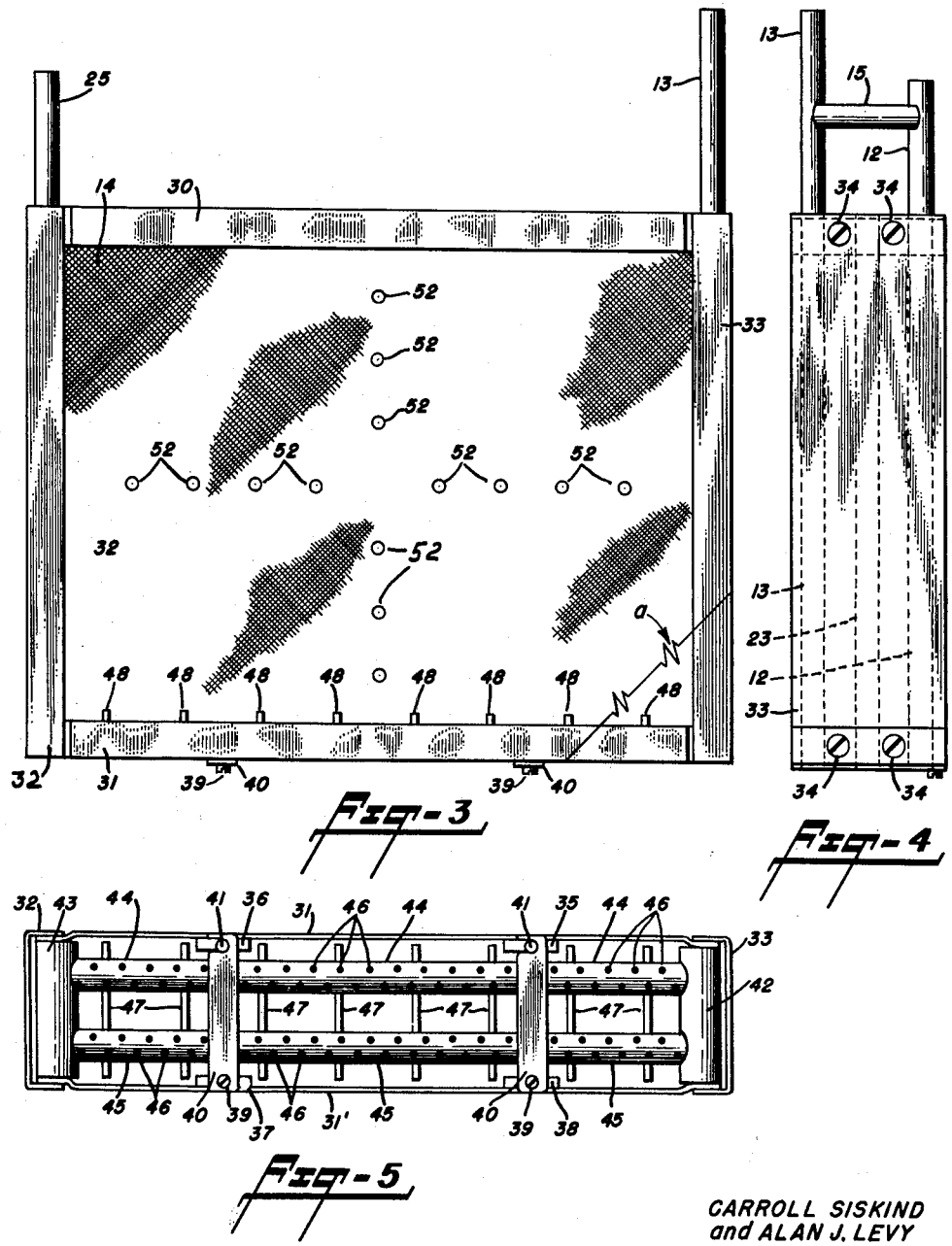

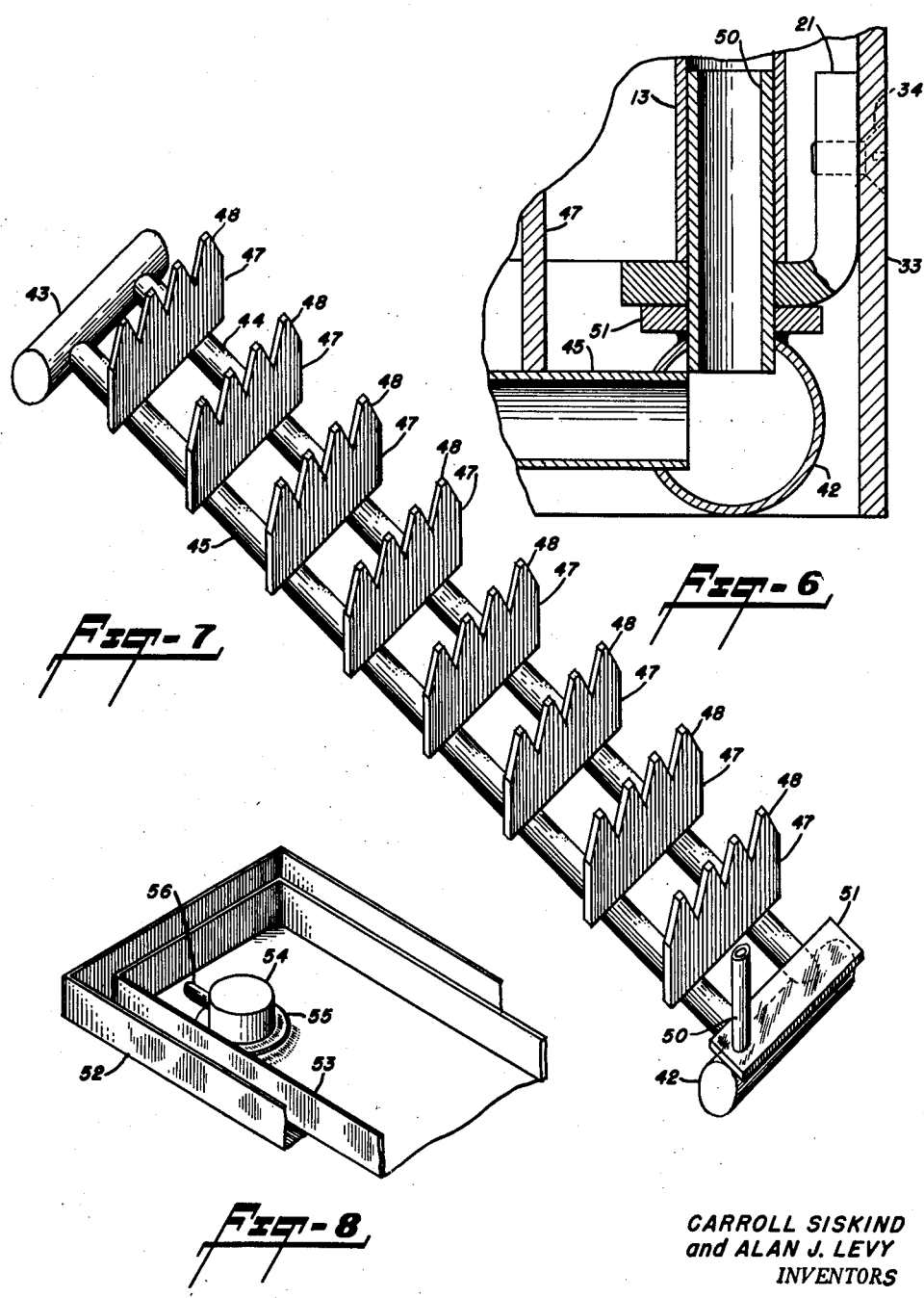

United States Patent Office 3,180,243
Patented Apr. 27, 1965

3,180,243
PHOTOGRAPH PROCESSING APPARATUS
Carroll Siskind, Neptune, N.J., and Alan J. Levy, Brooklyn, N.Y., assignors, by mesne assignments, to S. Blickman, Inc., Weehawken, N.J., a corporation of New York
Filed May 22, 1962, Ser. No. 196,763
7 Claims. (Cl. 95—98)

This invention relates to apparatus for use in processing photographs and more particularly to a vessel and basket for supporting photographic film or prints in a processing solution.

The processing of color film and prints involves a multi-step process wherein the film or print is immersed sequentially in various chemical solutions including one or more water baths. The processing solutions are contained in individual vessels, made of stainless steel, whereas a plurality of film or prints are positioned in spaced-apart. substantially parallel relation in a porous basket, which is designed to fit within the vessel. Inasmuch as some, or all, of the processing steps are carried out in a dark room, it is customary to provide a light-tight cover for the vessel. During the time when the film is immersed in certain of the processing solutions, it is highly desirable to agitate these solutions to promote a uniform chemical action over the entire surface of the film. This is generally done by passing an inert gas, such as nitrogen, through the solution.

In the following description, the invention will be described specifically with reference to a vessel and basket for processing color prints, but it will be understood the same inventive features can be incorporated in a vessel and basket for processing color film. The basket for holding the prints has spaced, vertical walls made of a plastic mesh material, such as, for example, Saran, affording a relatively free flow of the processing solution therethrough. Due to damage, or stretching during normal usage, these meshes must be replaced periodically.

One object of this invention is the provision of such a basket which is constructed in a manner to facilitate replacement of the mesh material.

In instances where continuous agitation of the solution is required during the processing of the film, the inert gas is permitted to escape from the bottom of the solution-containing vessel, which vessel itself is immersed in a water bath to maintain the solution at a relatively constant temperature. This is accomplished by means of a plenum secured in place at the bottom of the basket, such plenum being connected to a delivery tube which extends above the upper surface of the vessel. The gas is directed to the plenum by a plastic or rubber hose connected to the free end of the tube and the gas escapes through a plurality of holes formed in other tubes forming part of the plenum. In the past, it has been the practice to provide the basket with a mesh bottom disposed below the plenum with the plenum permanently connected to the basket and the delivery tube. Vessels and baskets for use with colored prints are made of a size to accommodate the largest size prints which run 16 x 20 inches. When such vessel and basket is to be used for developing smaller prints, the basket can be divided into sections by inserting pins laterally through the mesh walls. As an example, in a basket designed to accommodate five 16 x 20 prints in spaced, parallel relation, the pins may be inserted through the mesh separating walls to effectively divide the basket into four sections whereby twenty 8 x 10 prints can be accommodated. However, when the plenum forms a fixed part of the basket it is, at best, inconvenient and time-consuming to properly position the prints in the lower section of the divided basket.

It is, therefore, another object of this invention to provide a basket having a plenum for injecting a gas into the processing solution, which plenum is removably affixed to the basket and which plenum carries means for support of the prints placed into the basket.

A still further object of this invention is the provision of a light-tight cover for a solution-containing vessel which cover carries simple means for securing same firmly in place.

Another object of this invention is the provision of a vessel and basket for use in photographic processing, said basket including handle means to facilitate the insertion of the basket into the vessel and the removal therefrom, a cover for the tank, and manually-operable means carried by the cover and cooperating with the said handle means for latching the cover in place.

These and other objects and advantages will become apparent from the following detailed description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is an isometric view of an assembled vessel, basket and cover made in accordance with this invention, with parts broken away for purposes of description;

FIGURE 2 is an isometric view of the film divider, drawn to a larger scale;

FIGURE 3 is a front view of the basket which includes the film divider;

FIGURE 4 is an end view thereof;

FIGURE 5 is a bottom view thereof, showing the plenum;

FIGURE 6 is an enlarged fragmentary view, in cross section, showing a corner of the basket as defined by the broken line a in FIGURE 3;

FIGURE 7 is an isometric view of the plenum and the spacer members secured thereto; and FIGURE 8 is a fragmentary view taken from the inside of the cover and showing the cover-latching arrangement.

Reference, now, is made to FIGURE 1, wherein there is shown a rectangular tank, or vessel, 10 made of stainless steel, and adapted to contain a processing solution. Disposed within the vessel is a basket which comprises the frame member 11, the tubes 12 and 13 extending upwardly therefrom, and the mesh 14 which forms the spaced walls for separation of the prints placed therein. The tubes 12 and 13 are joined by a cross bar 15 secured thereto as by soldering or welding. Although not visible in the drawing, two similar tubes extend upwardly from the opposed end of the frame member, such tubes, however, having a protruding length equal to that of the relatively shorter tube 12 but also being joined by a cross bar. When the stainless steel cover 16 is in place, the shorter tubes lie within the cover whereas the longer tube 13 extends through a close-fitting hole formed in the cover. The tube 13 serves as a delivery tube to a plenum that is disposed at the bottom of the basket and is connectable to a source of inert gas as by a rubber hose. The other three tubes have closed ends, to prevent accumulation of liquid therein. In either event, the cross bars serve as convenient handle means for the placement and removal of the basket into and out of the vessel 10. Additionally, these cross bars serve as part of the mechanism for latching the cover in position, as will be described in more detail hereinbelow. For the present, it is pointed out that the cover carries two knobs, at opposed ends, such as the knob 17 visible in the drawing. These knobs are secured to separate shafts passing through the cover, each shaft having secured thereto a pin lying in a plane parallel to the top surface of the cover. When the knobs are rotated to a position along the cover axis, the pins engage the undersurfaces of the corresponding cross bars thereby latching the cover in position. A ninety degree rotation of the knobs, in either direction, removes the pins from the vicinity of the cross bars thereby freeing the cover for removal. A suitable cover handle 18 is secured to the cover by any suitable means.

Referring to FIGURE 2, the film divider comprises a separate unit formed of the tubes 12, 13 passing through holes formed in the upper bracket 20 and having lower ends disposed in holes formed in the lower bracket 21. A central tube, or rod, 23 likewise has ends disposed in holes formed in the two brackets. All three of the tubes are secured to the brackets, as by soldering or welding. Similarly, the tubes 24, 25 and 26 are secured to the brackets 27 and 28. Two threaded holes 29 are provided in each of the four brackets for removably securing the film divider to a frame member thereby to form a basket. The spaced partitional walls, for retaining the prints in spaced-apart relation during the processing operation, are formed of a plastic mesh 14, such as Saran. One end of the material is secured to the tube 25, as by screws, and the material is passed around the other tubes with the other end secured to the tube 12, thereby forming five spaced walls, each having a vertical width defined by the spacing between the brackets 20, 21 and 27, 28. As pointed out, above, the ends of the tubes are closed, with the exception of the delivery tube 13.

The film divider is placed within an open metal frame member, as shown in FIGURES 3–5, said frame member comprising the horizontal straps 30, 31 secured to the U-shaped vertical end plates 32, 33. Screws 34, threaded into the brackets of the film divider, secure the divider and the frame together and the cross bars 15, 15' (see FIGURE 2) now serve as handle means for manipulation of the basket as a whole.

As shown specifically in FIGURES 3 and 5, the lower straps 31, 31', of the frame member, have metal blocks 35–38 soldered, welded, or otherwise secured to the inner surfaces. The blocks 37 and 38 carry the screws, or rivets, 39 which pivotally attach the cross links 40 thereto, whereas the opposite blocks have headed rivets, or screws 41 extending therefrom. This arrangement secures the plenum in position, which plenum can be removed from the basket upon rotation of the cross links 90 degrees.

The plenum comprises opposed headers 42, 43 joined by the tubes 44, 45, said tubes having gas-escape holes 46 formed therein, it being noted that these holes are positioned at the lower portions of the tubes whereby the gas escapes in a downwardly direction and then percolates upwardly through the processing solution when the basket is positioned within the associated vessel. Secured to the tubes 44 and 45, crosswise thereof and in vertical planes, are a plurality of spacer members 47 having tapered tooth elements 48, see particularly FIGURE 7. When the plenum is in position, as shown in FIGURES 3 and 5, the lower edges of the mesh partition walls rest in the base of the tooth elements, thereby maintaining a proper spacing between the partition walls. Further, the spacer members form, effectively, the basket bottom preventing prints which are placed into the basket from sliding out therefrom.

The connection of the header 42, of the plenum, to the vertical delivery tube 13 is best shown in the enlarged view of FIGURE 6. The lower end of the delivery tube 13 terminates at the brackt 21, of the film divider, and is secured thereto, and this bracket is secured to the U-shaped frame member 33 by the screws 34, one screw being visible in this particular view. Extending laterally from the header 42 is the tube 45. A short connection tube 50, which fits snugly within the delivery tube, extends through a plate 51 and into the header, the tube, plate and header being secured rigidly together as by welding (see also FIGURE 7). It will now be clear that when the cross links 40 (see FIGURE 5) are rotated to the unfastened position, the entire plenum can be removed from the basket. Apart from the obvious advantages of such removable plenum arrangement, it facilitates the operation of loading the basket with a plurality of smaller prints.

For example, and with specific reference to FIGURE 3, it is customary to divide the basket for the accommodation of smaller prints by inserting pins laterally through the mesh material. As shown, the pins 52 effectively divide the basket into four sections. Now, in the case of a basket having a more or less permanently-affixed bottom, the procedure is to place the vertical pins into position first, slide the smaller prints from the open top of the basket into the two lower basket portions, insert the horizontal pins and then load the upper basket portions. Sliding the prints into the lower basket portions and the subsequent insertion of the horizontal pins requires care and eventually results in damage and/or stretching of the mesh material. In a basket constructed as described herein, the plenum is removed, simply and quickly, all of the pins are inserted to divide the basket into the desired number and size portions, and the prints are loaded from the open basket bottom as well as the top. This is done while retaining the basket in a generally horizontal position so that the plenum can be secured in position without the prints sliding out of the basket. Once the plenum is attached, the gas connection has automatically been made between the plenum and the delivery tube and the basket can be moved about by means of the handle members formed by the desired crossbars.

As stated above, the basket handle members form part of the mechanism for latching the vessel cover in position. As shown in the fragmentary view of FIGURE 8, the cover comprises two sections, an outer section 52 (visible in FIGURE 1), and an inner section 53. The bushing 54 has a reduced-diameter section, passing through a close-fitting hole provided for this purpose in the cover, and to which the operating knob is secured by means of a set screw. A spring washer 55 provides a desired amount of friction against undesired rotation of the knob. A radially-extending latching pin 56 is force-fitted into an appropriate hole formed in the bushing. As shown in FIGURE 8, the latching pin extends along the cover axis in which position the pin would be in slidable engagement with the cross bar of the basket handle, specifically, the cross bar 15' shown in FIGURE 2. A similar arrangement is provided at the opposite end of the cover for latching engagement with the basket cross bar 15. The spacing between the walls of the outer and inner sections of the cover is such that the open edges of the vessel are disposed between these cover sections when the cover is placed into position.

Having now described our invention, those skilled in this art will be able to make various changes and modifications to meet desired or required conditions arising in connection with the production and/or use of the particular vessel-basket combination. It is intended that such changes and modifications shall fall within the spirit and scope of the invention as recited in the following claims.

We claim:

1. A basket for use in photographic processing comprising,
    (a) a first set of spaced upper and lower brackets spaced from a second set of spaced upper and lower brackets,
    (b) elongated, spaced end members secured to the first set of brackets, said end members having portions protruding beyond the upper bracket,
    (c) elongated, spaced end members secured to the second set of brackets, said end members having portions protruding beyond the upper bracket, one of these end members being a delivery tube,
(d) mesh material extending between the first and second sets of brackets to form a plurality of spaced walls,
(e) an open frame member extending around the said sets of brackets,
(f) means removably securing the frame member to the said brackets and allowing for easy disassembly, and
(g) a plenum removably secured to the bottom of the frame member and including means forming an air passageway between the plenum and the said delivery tube.

2. The invention as recited in claim 1, including spacer members secured to the plenum, said spacer members having tooth-like free ends which extend between the walls formed of the mesh material.

3. The invention as recited in claim 1, including cross bars joining the protruding portions of adjacent said end members, thereby to form handle members.

4. The invention as recited in claim 3 in combination with,
(h) a vessel for containing a processing solution and within which the basket is disposed,
(i) a cover carrying a pair of rotatable members,
(j) means disposed within the cover and connected to the said rotatable members, said means engaging the said cross bars thereby to latch the cover in position.

5. A basket for use in photographic processing comprising,
(a) spaced end members,
(b) a mesh material extending between the said end members to form a plurality of compartments for accommodating prints,
(c) an open frame member removably secured to the said end members,
(d) a plenum, and
(e) means removably securing the plenum in operating position at the bottom of the basket, and easily releasable to allow for removal of said plenum,
(f) one of said end members being a delivery tube and the plenum including a connecting tube which slidably connects with the delivery tube when the plenum is secured in the operating position,
(g) the means removably securing the plenum in operating position comprising a cross link member pivotally secured to one portion of the frame member, said cross link member being rotatable beneath the plenum for latching engagement with a cooperating member carried by another portion of the frame member.

6. Photographic process apparatus comprising,
(a) a vessel containing a processing solution,
(b) a print basket positionable within the vessel, said basket including handle means extending from each end thereof,
(c) a cover positionable over the open end of the vessel and the contained basket,
(d) rotatable means carried by the cover and engageable with the handle means for latchingly securing the cover to the basket,
(e) a plenum secured to the basket at the bottom thereof,
(f) a delivery tube connected to the plenum and extending through the basket beyond the said handle means, and
(g) means forming an opening in the cover through which the said connecting tube passes when the cover is in position over the vessel.

7. In a basket for use in photographic processing and of the type comprising spaced walls of mesh material forming normally-vertical compartments for containing prints, a plenum disposed at the bottom of the basket, and a delivery tube extending from the plenum and upwardly through the basket, the improvements wherein the plenum is an easily removable unit and including latching means for securing the plenum to the basket, wherein the plenum unit extends substantially across the entire bottom of the basket and carries spaced cross members for supporting prints disposed in the basket, wherein the said spaced cross members are constituted by vertically disposed plate-like cross members with tooth-like elements extending from the free ends thereof and extending between the spaced walls of the mesh material.

References Cited by the Examiner
UNITED STATES PATENTS

| | | | |
|---|---|---|---|
| 162,958 | 5/75 | Shontz | 292—202 |
| 662,167 | 11/00 | Crissy et al. | 95—98 |
| 811,498 | 1/06 | Hall | 95—98 |
| 2,682,213 | 6/54 | Shapiro | 95—98 |
| 2,689,749 | 9/54 | Wise | 292—202 X |
| 2,831,595 | 4/58 | Aspenes | 292—202 |
| 2,892,394 | 6/59 | Hixon et al. | 95—100 |

NORTON ANSHER, *Primary Examiner.*

DELBERT B. LOWE, *Examiner.*